United States Patent [19]

Lee

[11] 4,110,159
[45] Aug. 29, 1978

[54] METHOD OF FABRICATING NUCLEAR FUEL

[75] Inventor: Harvey Robert Lee, Georgetown, Canada

[73] Assignee: Canadian General Electric Company Limited, Ontario, Canada

[21] Appl. No.: 774,928

[22] Filed: Mar. 7, 1977

[30] Foreign Application Priority Data

Mar. 12, 1976 [CA] Canada .................................. 247800

[51] Int. Cl.$^2$ .............................................. G21C 5/18
[52] U.S. Cl. ........................................ 176/68; 176/78
[58] Field of Search ............................. 176/68, 76, 78

[56] References Cited

U.S. PATENT DOCUMENTS

| 3,354,044 | 11/1967 | Robertson | 176/68 |
|---|---|---|---|
| 3,427,222 | 2/1969 | Biancheria et al. | 176/68 |
| 3,759,786 | 9/1973 | Abate-Daga et al. | 176/68 X |
| 3,917,768 | 11/1975 | Abate-Daga et al. | 176/68 |
| 3,933,582 | 1/1976 | MacNabb | 176/68 |

OTHER PUBLICATIONS

Hawley, *Condensed Chem. Dictionary*, Van Nostrand Reinhold Co., N.Y., N.Y., Eighth Edition, pp. 884–885.

*Primary Examiner*—Peter A. Nelson
*Attorney, Agent, or Firm*—Raymond A. Eckersley

[57] ABSTRACT

Nuclear fuel for use in power generating nuclear reactors is fabricated, using a liquid permeable compressed form, saturating the form with an inert liquid which is a solvent for a desired additive solution, immersing the saturated form within a body of the desired solution for a time sufficient to produce a predetermined diffusion of additive into the form, removing the form from the solution body, and removing the solvent from the form so as to retain a predetermined concentration of additive in the fuel form. This permits the impregnation of pellets with a desired non-uniform addition of material, generally of either a fissile or poisonous nature, to achieve desired in-reactor characteristics for the fuel.

6 Claims, No Drawings

METHOD OF FABRICATING NUCLEAR FUEL

This invention is directed to a process for manufacturing nuclear fuel, and in particular to a diffusion process for impregnating porous fuel bodies with desired additive such as enriched fissile fuel material or such as a burnable poison.

The present invention relates to a particular technique of providing a composite material starting with a porous body. The additive is supplied as a liquid suspension which impregnates the pore structure of the porous body. Specifically, the porous body is first impregnated with a liquid transport medium which fills the pores. The porous body is then soaked in the liquid additive suspension to enable transfer of the additive to the already liquid filled pore openings by a diffusion mechanism.

It is already known in the ceramic arts to impregnate a porous compact with a liquid suspension of one or more additives. In one known method, the porous body is immersed in the liquid suspension which permits the additive to enter the pore openings by capillary infiltration. The infiltration can be assisted by first evacuating the pore openings to preclude gas entrapment within the porous member. Another technique allows liquid additive infiltration under pressure to more readily fill all the voids.

Since capillary infiltration is relatively fast, it has a tendency to provide a uniform concentration of the additive throughout the porous compact.

In a modification of these prior processes, impregnation is carried out with a liquid solution of the additive and the process is interrupted with the objective of establishing a concentration gradient directed from the surface of the porous member towards its core by the capillary action taking place. The additive present in the pores is thereafter fixed by chemical precipitation and excess solution removed.

Past experience with this capillary infiltration technique has found the concentration gradient of the additive established by the capillary action is either minimal or non-uniform. Since the capillary action continues after the porous body has been removed from the liquid additive suspension and the liquid is distributed throughout the pore structure in a relatively short period of time, it is extremely difficult to interrupt the process as a practical matter and form any desired concentration gradient of additive in the porous body. Hence, there is insufficient control for practical purposes.

In the case of nuclear fuel wherein additive material such as enrichment or burnable poison requires to be rather precisely controlled in its distribution throughout the fuel body, the noted prior art processes of capillary infiltration fail to give sufficiently consistent control of the distribution of the additive material for satisfactory fuel manufacture.

Such lack of consistency can cause loss of integrity of a fuel body when subsequent thermally induced densification is carried out.

A further problem encountered in the nuclear fuel industry is the need to control the reactivity across the cross-section of the fuel. The problem of fuel containing fissile material or burnable poison material provided by infiltration using the capillary infiltration technique is that the desired control is lacking and the necessary control of variation in enrichment or poison profile cannot be exercised.

The practice of one liquid diffusion technique adaptable to carrying out the present invention is given in U.S. Pat. No. 3,741,734, issued June 26, 1973, Dunham, which teaches the technique of liquid-to-liquid diffusion in the preparation of a refractory metal dispersion alloy such as thoriated tungsten, wherein a continuous gradient of additive concentration is provided.

In accordance with the present invention it was realized that the consistency of results provided by Dunham would be of particular and unobvious advantage in the preparation of nuclear fuel wherein specific control of the additive material is required to achieve a desired gradient of additive concentration.

The practice of the present invention makes more practicable the nuclear fuel enrichment process of Canadian Pat. No. 872,722, issued June 8, 1971, Pawliw wherein $UO_2$ pellets are impregnated with a plutonium compound which is then reduced to $PuO_2$. The particular aspect of this prior patent is the capability of dealing with toxic fissile enrichment material by way of a diminished number of glove box operations, thereby reducing the expense and complexity of the enrichment operation. These advantages accrue also to the present invention.

Accordingly it will be understood that in the practice of the present invention there are certain advantages in performing the liquid-to-liquid diffusion process as nearly as possible at the end of the fuel production line commensurate with achieving the desired control of concentration and of additive profile or gradient.

The present invention provides a process of incorporating a solid nuclear fuel additive into a porous body of ceramic or metallurgical fuel composition so that a predetermined concentration gradient of the additive is established which is readily and consistently obtained.

The invention thus provides various ceramic and metallurgical nuclear fuel products having a concentration gradient of one or more solid additives disposed in a matrix of the starting ceramic or metallurgical fuel material. Various methods may be utilized of heat treating the porous form after one or more additives have been incorporated in accordance with the present invention to provide novel dispersion alloy products.

Briefly, the liquid diffusion process of the present invention impregnates a porous compact with an inert liquid solvent for the additive. The liquid filled compact is then immersed in a solution of the additive until a sufficient time period has elapsed to permit the desired degree of liquid diffusion to take place. In this manner, the additive enters into at least a portion of the compact already occupied by solvent. The liquid diffusion process can be interrupted when a predetermined amount of the additive has entered into the pores to provide a continuously diminishing concentration of the additive in the direction of the central core of the porous compact.

More particularly, the maximum additive concentration exists at the exterior surface portion of the porous member. The concentration continuously diminishes as the distance increases to the centre core of the porous body. Liquid solvent is then removed from the infiltrated porous compact to retain a continuous concentration gradient of solid additive in the pores of the composite member formed. Various forms of heat treatment after incorporation of the additive may be used to convert the additive so as to provide a variety of novel dispersion alloy products.

Basically, the liquid diffusion process of the present invention comprises impregnating a porous compact having an interconnected pore structure with an inert liquid solvent until the pore structure of the compact is essentially filled with solvent. Thereafter, the solvent-filled compact is immersed in a liquid solution containing a dissolved solid fuel additive for a sufficient period of time to permit liquid diffusion of the dissolved additive into at least a portion of the solvent contained in the pores of the compact.

Upon impregnation with the solid additive, the compact is removed from the solution when a predetermined extent of liquid diffusion has taken place. The solvent is then removed from the pores of the compact to retain a concentration gradient of the solid additive in the pores of the composite formed. By "inert liquid solvent" is meant a solvent for the particular additive which can be removed by drying or heating the liquid filled compact without leaving a residue in the pore structure of undergoing any significant chemical reaction with the base matrix composition.

When a first liquid solvent is used to saturate the compact while a second liquid solvent is used to prepare the additive solution, it follows that the concentration gradient of the solid additive in the porous compact, after removal of the solvent, will be defined by liquid diffusion principles applicable to diffusion of the additive from the second liquid solvent into the first liquid solvent.

The physical state of the initial porous compact is relatively unimportant provided interconnected porosity is present within the compact.

The concentration gradient which may be produced by the process within the porous compact has particular benefit to the nuclear industry.

Thus, if the solid additive is fissile nuclear fuel material, the greater additive concentration at the compact periphery provided in accordance with the present invention will give greater neutron efficiency during operation of a reactor. Neutrons will escape from the compact more readily as self-shielding effects can be significantly reduced.

Also in the case that the solid additive is fissile, heat generation will be greater at the compact periphery and decrease towards the centre. In low thermal conductivity ceramic nuclear fuel this is particularly beneficial in the case of an operating incident. The stored thermal energy of the fuel is significantly lower than if the fissile additive were uniformly distributed. In this latter case, fuel temperature is significantly higher at the compact centre than the periphery, so that the effective stored thermal energy is disadvantageously greater.

The liquid diffusion technique according to the present invention can be used to simplify production of fuel in which highly active or toxic isotopes are used for enrichment. As-formed or partially heated-treated matrix materials, of a radio-logically innocuous material i.e. natural uranium oxide or natural thorium, oxide may be fabricated by conventional forming techniques. This part of the fuel production process need not be carried out in a shielded or hot cell facility. Liquid diffusion impregnation, of either the as-formed or partially heat-treated compact. With solutions of highly toxic or radio-active isotopes need to be carried out in either hot-cell or shielded facilities.

With aqueous based solvents, purified feed from ion exchange columns of fuel reprocessing plants may be used as the infiltrant. The subject process can thus simplify the fuel reprocessing operation and eliminate several expensive stages from such operations. Highly toxic dusts can be eliminated and the size, complexity requirement of such hot-cell facilities greatly reduced.

In the case that the solid additive is a burnable poison, such as gadolinium oxide, the liquid diffusion technique taught herein can be used to simplify production of fuel containing such poisons and enhance in-reactor fuel performance. Thus in operation, using such fuel, excess neutrons would be absorbed by the poison at or close to the surface of the pellet, to block or limit the ingress of neutrons to the pellet interior. Neutron absorption would be more efficient and the poisoning effect greater per unit mass of poison added to the fuel. In the event that the poisoning effect is temperature dependent, an enhanced absorption characteristic would likely result, as the pellet temperature profile varies greatly across the pellet diameter, being greatest at the centre and least at the periphery.

The present invention makes it possible that problems associated with cracking, normally encountered in capillary impregnated ceramic bodies, would be greatly reduced, as the diminishing concentration gradient extending from the compact periphery towards it centre would produce a much more controlled additive distribution within the pellet.

Working within the previously stated condition, that the fuel form shall comprise a compact wherein exists interconnected porosity of sufficient extent to permit the desired extent of diffusion, it will be understood that the process is virtually unlimited as to the nuclear fuel material. The density range also can vary widely, from about 40% to about 95% of theoretical density.

Thus, there may be used for a ceramic matrix natural uranium oxide ($UO_2$), natural thorium ($ThO_2$) or natural plutonium oxide ($PuO_2$). Enrichment material can comprise $U_{235}$ or $U_{233}$ or $Pu_{239}$, and the burnable poison material can comprise $Gd_2O_3$ or B.

Similarly, in the case of a metallic matrix, thorium or uranium may be used.

Enrichment material may involve any fissile isotope, being generally in solution as the nitrate, probably dissolved in water e.g. $UH(MO_3)_2$ in water.

The first inert solvent, used for initial diffusing through the fuel form might comprise tributyl phosphate (TBP).

Suitable enrichment feed stocks comprising nitrate salts in water such as from a reprocessing plant might be in concentrations ranging from 50 to 500 grammes enrichment per liter of solution.

Thermal densification may be resorted to a completion of the diffusion of the additive or mixtures, of additives, so as to typically raise the density from about 5.5 Mg per cubic meter to approximately 10.6 $Mg.m^{-3}$.

Raising the matrix temperature above that of the additive results in melting of the additive phase, which promotes densification and enhances alloy formation.

It is contemplated that the present invention makes possible the provision of a fuel compact wherein additive material is provided while maintaining unchanged a core portion of the original matrix material.

What I claim as new and desire to secure by Letters Patent of the United States is:

1. A nuclear fuel form based on an initially porous body comprising at least one material selected from the group consisting of uranium, thorium and plutonium and the oxides thereof having at least one solid additive impregnated therein to a predetermined extent, selected from the group consisting of nuclear fissile material and burnable poisons providing a controlled variation of additive as an additive concentration gradient having maximum additive concentration at an outer face of said form and diminishing in value with increase in distance from said outer face, extending through a portion of the form.

2. The fuel as claimed in claim 1 wherein said additive is selected from $U_{235}$, $U_{233}$, $Pu_{239}$, $Gd_2O_3$, and B and mixtures thereof.

3. The fuel as claimed in claim 1, wherein said initially porous body is saturated with tributyl phosphate as an initial additive solvent, and subsequently with a physically compatible solution of said additive.

4. Nuclear fuel as claimed in claim 1 having said additive dispersed through a predetermined radially outer portion of said form.

5. Nuclear fuel as claimed in claim 4 having said additive dispersed as a substantially uniformly diminishing concentration proportionate to the distance from said form outer face.

6. Nuclear fuel as claimed in claim 5 wherein said additive is selected from $U_{235}$, $U_{233}$, $PU_{239}$, $Gd_2O_3$ and B and mixtures thereof.

* * * * *